United States Patent Office 2,938,013
Patented May 24, 1960

2,938,013

VINYL CHLORIDE RESIN STABILIZED WITH DIBUTYL TIN BIS (PROPYLENEGLYCOL MALEATE)

Gerry P. Mack, Jackson Heights, and Emery Parker, New York, N.Y., assignors, by mesne assignments, to Carlisle Chemical Works, Inc., Reading, Ohio, a corporation of Ohio No Drawing. Filed Aug. 9, 1954, Ser. No. 448,760

2 Claims. (Cl. 260—45.75)

The invention relates to new organotin derivatives and compositions containing the same.

The novel compounds comprise reaction products of a partial ester of a dicarboxylic or polycarboxylic acid, which contains one free carboxyl group and at least one free alcoholic hydroxyl group, with an organotin compound selected from the group consisting of monomeric or polymeric organotin hydroxides, oxides, and alkoxides. In said compounds, said ester is bound through the oxygen of the carboxyl group to the tin atom of the organo-tin compound and the free hydroxyl group of the ester component imparts to the compounds particularly valuable properties for the use as stabilizers for halogen-containing resins.

The compounds may be broadly defined by the general formula (1) $R^1R^2XSnZ$ wherein $R^1$ and $R^2$ represent different or preferably the same aliphatic, alicyclic, or aromatic hydrocarbon radicals; Z is the radical of an ester of a polycarboxylic acid in which all but one of the carboxyl groups are esterified by a dihydric or polyhydric alcohol. In the simplest case, Z is the radical of a half ester of a dicarboxlyic acid of the formula (2) $OOCR^5COOY$ wherein $R^5$ is a saturated or unsaturated divalent hydrocarbon radical and Y the residue of a dihydric or polyhydric alcohol containing at least one free hydroxyl group. X is a member of the group consisting of $R^3$, $OR^4$, Z and $(R^1R^2SnO)_{x-1}Z$, wherein the last recited group is characteristic for polymeric compounds of the type involved. $R^3$ designates the same type of hydrocarbon radical as represented by $R^1$ and $R^2$; if X is $R^3$, the compounds are esters of trihydrocarbontin hydroxides; $OR^4$ is an alkoxy radical derived from aliphatic, alicyclic, or aromatic alcohols, and the compounds containing $OR^4$ are ether esters of hydrocarbon substituted stannanediols, whereas in the case of X=Z the compounds are diesters of such stannanediols. If X is the group $(R^1R^2SnO)_{x-1}Z$, the compounds are esters of linear hydrocarbon substituted polystannanediols, where $x$ designates the degree of polymerization.

The ester used for introducing the group Z may be composed of any combination of a di- and polycarboxylic acid with a glycol or polyol. Suitable acids are, for instance, adipic acid, sebacic acid, fumaric acid, maleic acid, succinic acid, malonic acid, glutaric acid, itaconic acid, aconitic acid, citraconic acid, citric acid, tartaric acid, and the like. As examples of suitable glycols and polyhydric alcohols, we may list: ethylene glycol, diethylene glycol, polyethylene glycol, the corresponding propylene glycols, glycerol, trimethylol methane, trimethylol propane, pentaerythritol, sorbitol and other sugar alcohols, and the like.

The new compounds are prepared by reacting an ester as defined hereinabove with an organotin oxide, hydroxide or alkoxide; suitable organic groups of the organotin radical are, for instance, methyl, ethyl, propyl, butyl, amyl, hexyl, octyl, lauryl, allyl, benzyl, phenyl, tolyl, furfuryl, cyclohexyl, naphthyl, and others. If the reaction is carried out with an organotin alkoxide, we prefer to use such an alkoxide which is derived from a lower alcohol, preferably a methoxide. If a monomeric dihydrocarbon tin dialkoxide is reacted with only one mole of the ester, the corresponding ether ester is obtained, i.e. a compound of the Formula 1, wherein X is alkoxide; with two moles of the ester, the diester is obtained, that is X=Z. In the case of polymeric dihydrocarbon tin dialkoxides, polystannanediol derivatives of the formulae (3) 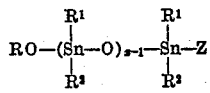

and (4) 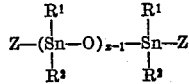

respectively, are obtained.

The compounds of the invention are mostly liquids when in the monomeric state; the higher polymers are colorless solids.

The invention is further illustrated by the following examples, in which the amounts are given in parts by weight.

*Example 1*

348 parts of propylene glycol maleate halfester were added to a slurry of 250 parts of dibutyltin oxide in 300 cc. of toluene. The solvent and the water of reaction were removed by heating the bath in vacuo at 90 to 95° C.

The liquid product obtained in almost theoretical yield was dibutyltin di(propyleneglycol maleate) of the formula

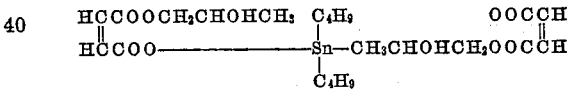

having the following characteristics

Ref. ind. at 20° C_____ 1.5060
Sp. gr. at 20° C_____ 1.374
Sn found 19.5%_____ (theory 20.5%).

It is possible that the compound is a mixture of the two isomeric configurations of the maleic ester group

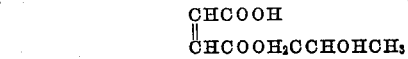

or

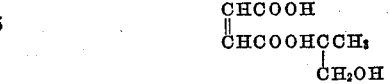

In the same manner, the dibutyltin di (propylene glycol fumarate) was prepared.

*Example 2*

408.4 parts of glyceryl itaconate were added to 192.8 parts of diethyltin oxide dispersed in warm toluene, and the batch was heated until 36 parts of water had distilled out as an azeotrope. Subsequently, the toluene was removed under reduced pressure.

The remaining compound had the formula

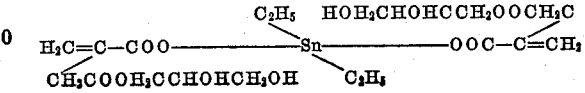

Example 3

61.4 parts of tributyltin hydroxide were slowly added with stirring to 56 parts of di(ethyleneglycol) citrate in anhydrous isopropyl alcohol. After a complete solution was obtained, vacuum was applied and the water of reaction was removed together with the solvent. The obtained compound had the formula

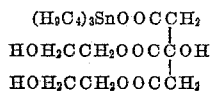

Sn found 21.0% (theory 21.4%).

Example 4

Polymeric dibutyltin dimethoxide was prepared according to Example 1 of Patent No. 2,626,953, by gradually adding at a temperature of 0° C. sodium methoxide to dibutyl tin chloride dissolved in toluene. After short heating to 80° C., the reaction product was filtered hot from the precipitated sodium chloride and the toluene was distilled off.

150 parts of the thus obtained polymeric dibutyltin dimethoxide having a polymerization degree of 1.3 were dissolved in toluene, and 180 parts of dipropylene glycol maleate halfester were added to the solution. The methanol split off during the reaction was distilled out under reduced pressure, together with the toluene. The product thus obtained had the formula

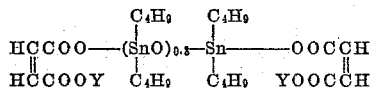

wherein

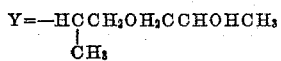

Like other organotin esters and ether esters, the new compounds are excellent stabilizers to protect halogen-containing resins against deterioration and discoloration due to the influence of heat and light. They are superior to said known esters and ether esters because the free hydroxyl groups of the ester component increases the compatibility of the new compounds with said resins and the plasticizers used therein.

Due to the highly polar nature of the novel ester compounds, their compatibility with resins and plasticizers is greatly enhanced; if decomposition should take place during heat processing, the decomposition products remain compatible with the resin and do not have the tendency of sweating out. Their properties are of particular importance in the preparation of optically clear rigid vinyl sheeting, where no polar plasticizers are present and incompatible ingredients would produce haziness and clouding.

A further advantage of the compounds is their lubricating property; whereas the known organo-tin esters of dicarboxylic acids stick to the rolls of the rubber mill in compounding the resin blends, blends containing the esters of the invention are readily processed and do not adhere to the rolls.

An additional advantage of the new compounds when used as stabilizers is their reduced extractability with fats, like butter and oleomargarine, which renders them particularly useful as ingredients of plastic wrappings for foodstuffs.

The new stabilizers may be used alone or in mixture with other stabilizers, for instance with other organotin compounds, and particularly with organic phosphites, epoxy compound, and/or salts of bivalent or tetravalent metals, such as cadmium, barium, zinc, or tin, with fatty acids containing from 6 to 18 C atoms.

Halogen-containing resins, which are made heat and light resistant by the new stabilizers, are particularly polymers and copolymers of vinyl chloride. An illustrative list of such resins is given in our Patent No. 2,592,926. They are incorporated in amounts from 0.1 to 10%, preferably 0.5 to 2 percent by weight of the resin. If used in combination with other stabilizers, the total amount of stabilizer should not exceed about 10% by weight of the resin.

Example 5

1.5 g. each of the compounds of Examples 1 to 4 were added to 100 g. of vinyl chloride resin together with 50 g. of dioctyl phthalate, and the mixture was milled on a two-roll mill for 10 minutes at 330° F. until a uniformly fluxed plastic mass was obtained. From this mass, 40 mil thick sheets were pressed out in a platen press between polished chrome plated plates at 3,000 p.s.i. at 330° F. 2 x 2" squares of these films were heated in an air circulating oven at 300° F. No discoloration was observed in any case prior to 60 min. heating, and yellowing started only after 95 min. The results were generally at least as good or better than those obtained with corresponding organotin esters, where the ester group was the half ester of the dicarboxylic acid with a monohydric alcohol; the main advantages of the new esters, however, were the ease of processing in the rubber mills and the other advantages recited hereinabove.

As various changes and modifications of the examples may be made without departing from the spirit and scope of the invention, it is to be understood that we do not limit ourselves to the specific embodiments thereof except as defined in the appended claims. In the claims, the term "polycarboxylic acid" is used in its broadest meaning including also dicarboxylic acids, and similarly the term "polyhydric alcohol" includes dihydric alcohols, that is, glycols.

What we claim is:

1. A heat and light resistant resin composition comprising a resinous polymer of vinyl chloride, and as a stabilizer dibutyl tin bis propylene glycol maleate in an amount of 0.1 to 10 percent by weight of said resinous constituent.

2. The composition of claim 1, wherein the resinous polymer is a homopolymer.

References Cited in the file of this patent

UNITED STATES PATENTS

| | | |
|---|---|---|
| 2,307,157 | Quattlebaum et al. | Jan. 5, 1943 |
| 2,489,518 | Burt | Nov. 29, 1949 |
| 2,630,442 | Church et al. | Mar. 3, 1953 |
| 2,636,891 | Gregory | Apr. 28, 1953 |
| 2,643,242 | Churchill | June 23, 1953 |
| 2,715,111 | Weinberg | Aug. 9, 1955 |
| 2,766,273 | Bruins et al. | Oct. 9, 1956 |